US007098981B2

(12) United States Patent
Nakayoshi et al.

(10) Patent No.: US 7,098,981 B2
(45) Date of Patent: Aug. 29, 2006

(54) LIQUID CRYSTAL DISPLAY DEVICE HAVING PARTICULAR ELECTRODE STRUCTURE FOR REPAIR OF DISCONNECTED SIGNAL LINE

(75) Inventors: Yoshiaki Nakayoshi, Ooamishirasato (JP); Kazuhiko Yanagawa, Mobara (JP)

(73) Assignee: Hitachi Displays, Ltd., Mobara (JP)

( * ) Notice: Subject to any disclaimer, the term of this patent is extended or adjusted under 35 U.S.C. 154(b) by 0 days.

(21) Appl. No.: 10/638,403

(22) Filed: Aug. 12, 2003

(65) Prior Publication Data
US 2004/0046917 A1    Mar. 11, 2004

(30) Foreign Application Priority Data
Aug. 15, 2002 (JP) .............................. 2002-236860

(51) Int. Cl.
*G02F 1/1343* (2006.01)
(52) U.S. Cl. ....................... 349/141; 349/38; 349/39; 349/54; 349/55
(58) Field of Classification Search ................. 349/54, 349/55
See application file for complete search history.

(56) References Cited

U.S. PATENT DOCUMENTS 5,953,088 A * 9/1999 Hanazawa et al. .......... 349/110

6,208,399 B1    3/2001 Ohta et al. .................. 349/139

FOREIGN PATENT DOCUMENTS

JP    2000-292803    10/2000
KR    2000-0025444    5/2000

* cited by examiner

*Primary Examiner*—Andrew Schechter
*Assistant Examiner*—Michael H. Caley
(74) *Attorney, Agent, or Firm*—Antonelli, Terry, Stout and Kraus, LLP

(57) ABSTRACT

A liquid crystal display device with a pair of substrates with liquid crystal layer therebetween, at least a first conductive layer formed on one of said pair of substrates, at least a first insulating layer formed on the first conductive layer, a plurality of drain signal lines formed on the first insulating layer in overlapping relation to the first conductive layer, at least a second insulating layer formed on the drain signal line, and at least a second conductive layer formed on the second insulating layer and elongated substantially along the drain signal line in overlapping relation to the drain signal line, wherein the second conductive layer is spaced from the overlapping region of the first conductive layer and the drain signal line.

4 Claims, 15 Drawing Sheets

LIQUID CRYSTAL DISPLAY DEVICE HAVING PARTICULAR ELECTRODE STRUCTURE FOR REPAIR OF DISCONNECTED SIGNAL LINE

BACKGROUND OF THE INVENTION

1. Field of the Invention

The present invention relates to a liquid crystal display device.

2. Description of the Related Art

As the constitution of a liquid crystal display device, various types of constitutions have been known. To explain a lateral field type liquid crystal display device as an example, in pixel regions formed on a liquid-crystal-side surface of one substrate of respective substrates which are arranged to face each other in an opposed manner while sandwiching liquid crystal therebetween, pixel electrodes and counter electrodes are formed, and optical transmissivity of the liquid crystal is controlled in response to an electric field generated between respective electrodes.

Further, with respect to an active matrix type liquid crystal display device to which the above technique is applied, on a liquid-crystal-side surface of one substrate, respective regions which are surrounded by gate signal lines which extend in the x direction and are arranged in parallel in the y direction and drain signal lines which extend in the y direction and are arranged in parallel in the x direction are defined as the above-mentioned pixel regions and a switching element is provided to each pixel region.

Then, a video signal from the drain signal line is supplied to the pixel electrode by way of the switching element and, at the same time, the switching element is turned on in response to a scanning signal from the gate signal line.

Further, a signal which becomes the reference with respect to the video signal is supplied to the counter electrodes by way of counter voltage signal lines, for example.

This liquid crystal display device is known as a liquid crystal display device which can obtain a display of a good quality having a favorable contrast and has so-called wide viewing angle characteristics.

SUMMARY OF THE INVENTION

When the definition of the liquid crystal display device is increased and the distance between lines becomes short, the probability of occurrence of drawbacks such as the disconnection of signal lines (for example, drain signal lines or the like) or short-circuiting with other signal lines are increased in a manufacturing stage. Further, in the lateral field type liquid crystal display device, with respect to the pixel in each pixel region, due to a constitution that strip-like counter electrodes and pixel electrodes are alternately arranged and the like, the distance between electrodes or the distance between the electrode and the line is relatively finely formed and, along with such relatively fine molding, the probability of occurrence of drawbacks such as the disconnection of signal lines (for example, drain signal lines or the like) or short-circuiting with other signal lines is relatively increased in a manufacturing stage thus giving rise to a tendency that a so-called yield rate is lowered.

Since the disconnection or the like of one signal line will bring all of a group of pixels related to the signal line into display failure, it is necessary to perform repairing such that the disconnection or the like of one signal line causes the display failure of one pixel, for example.

The present invention has been made in view of such a circumstance and it is an advantage of the present invention to facilitate repairing of a liquid crystal display device.

To illustrate the summary of typical inventions among inventions disclosed in the present application, they are as follows.

(1) A liquid crystal display device with a pair of substrates with liquid crystal layer therebetween, at least a first conductive layer formed on one of said pair of substrates, at least a first insulating layer formed on the first conductive layer, a plurality of drain signal lines formed on the first insulating layer with overlapping relation to the first conductive layer, at least a second insulating layer formed on the drain signal line, at least a second conductive layer formed on the second insulating layer and elongated substantially along the drain signal line with overlapping relation to the drain signal line, wherein the second conductive layer is stand off from the overlapping region of the first conductive layer and the drain signal line.

(2) A liquid crystal display device with a pair of substrates with liquid crystal layer therebetween, a plurality of gate signal lines and at least a first conductive layer formed on one of said pair of substrates, at least a first insulating layer formed on the gate signal line, a plurality of drain signal lines formed on the first insulating layer and crossing to the gate signal line, at least a second insulating layer formed on the drain signal line, wherein the first conductive layer is elongated substantially along the drain signal line and having overlapping portion to the drain signal line, at least a second conductive layer formed on the second insulating layer and elongated substantially along the drain signal line with overlapping relation to the drain signal line and the first conductive layer, a width of the second conductive layer at overlapping region of the drain signal line and the first conductive layer is smaller than not overlapping region of the drain signal line and the first conductive layer.

(3) A liquid crystal display device with a pair of substrates with liquid crystal layer therebetween, at least a first conductive layer formed on one of said pair of substrates, at least a first insulating layer formed on the first conductive layer, a plurality of drain signal lines formed on the first insulating layer with overlapping relation to the first conductive layer, at least a second insulating layer formed on the drain signal line, at least a second conductive layer formed on the second insulating layer and elongated substantially along the drain signal line with overlapping relation to the drain signal line, wherein the second conductive layer have a hole at the overlapping region of the first conductive layer and the drain signal line.

Here, the present invention is not limited to the above-mentioned constitutions and various modifications can be made without departing from the technical concept of the present invention.

DESCRIPTION OF THE PREFERRED EMBODIMENTS

Embodiments of the liquid crystal display device according to the present invention are explained hereinafter in conjunction with attached drawings.

Embodiment 1.

<<Liquid Crystal Display Panel>>

Figure 2A:
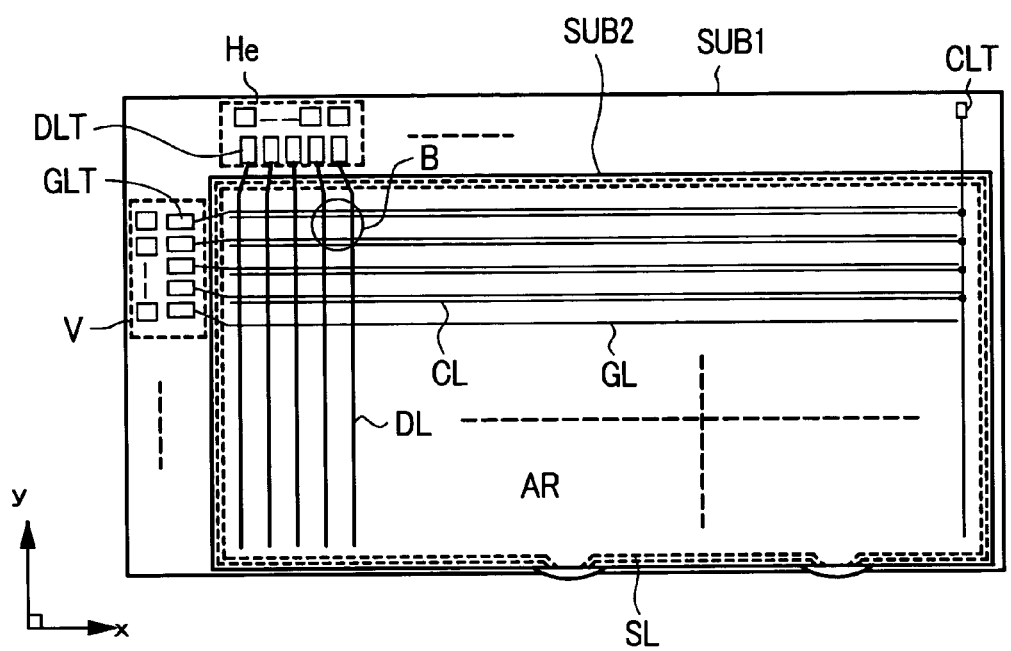
FIG. 2 is a plan view showing one embodiment of the whole of the liquid crystal display device according to the present invention.
Figure 2B:
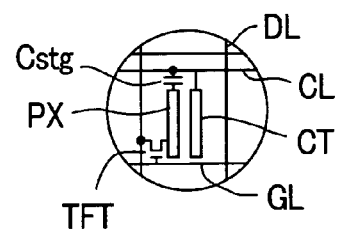

FIG. 2 is a plan view showing one embodiment of a liquid crystal display panel incorporated into a liquid crystal display device according to the present invention. FIG. 2(A) is a view showing the whole constitution of the liquid crystal display device and FIG. 2(B) is a view for explaining one example of an equivalent circuit by enlarging a pixel region surrounded by a circle in FIG. 2(A).

In FIG. 2, there are provided a pair of transparent substrates SUB1, SUB2 which are arranged to face each other while sandwiching liquid crystal therebetween, wherein the liquid crystal is sealed by a sealing material SL which is also served for fixing another transparent substrate SUB2 to one transparent substrate SUB1.

On a liquid-crystal-side surface of the above-mentioned one transparent substrate SUB1 which is surrounded by the sealing material SL, gate signal lines GL which extend in the x direction and are arranged in parallel in the y direction and the drain signal lines DL which extend in the y direction and are arranged in parallel in the x direction are formed.

Regions which are surrounded by the respective gate signal lines GL and the respective drain signal lines DL constitute pixel regions and, at the same time, a mass of respective pixel regions in a matrix array shape constitutes a liquid crystal display part AR.

Further, on the respective pixel regions which are arranged in parallel in the x direction, a common counter voltage signal line CL is formed such that the counter voltage signal line CL runs in respective pixel regions. The counter voltage signal line CL constitutes a signal line for supplying a voltage which becomes the reference with respect to the video signal to the counter electrodes CT of respective pixel regions which will be explained later.

In each pixel region, a thin film transistor TFT which is operated by a scanning signal from the one-side gate signal line GL and a pixel electrode PX to which a video signal is supplied from the one-side drain signal line DL by way of the thin film transistor TFT are formed.

The pixel electrode PX generates an electric field between the pixel electrode PX and the counter electrode CT which is connected to the counter voltage signal line CL and optical transmissivity of the liquid crystal is controlled in response to this electric field.

Respective one ends of the gate signal lines GL extend over the sealing material SL and the extended ends constitute terminals GLT to which output terminals of a scanning signal driving circuit V are connected. Further, to input terminals of the scanning signal driving circuit V, signals from a printed circuit board (not shown in the drawing) which is arranged outside the liquid crystal display panel are inputted.

The scanning signal driving circuit V includes a plurality of semiconductor devices, wherein a plurality of gate signal lines GL which are adjacent each other are formed into a group and one semiconductor device is allocated to each group of gate signal lines GL.

In the same manner, respective one ends of the drain signal lines DL extend over the sealing material SL and the extended ends constitute terminals DLT to which output terminals of a video signal driving circuit He are connected. Further, to input terminals of the video signal driving circuit He, signals from a printed circuit board (not shown in the drawing) which is arranged outside the liquid crystal display panel are inputted.

The video signal driving circuit He also includes a plurality of semiconductor devices, wherein a plurality of drain signal lines DL which are adjacent each other are formed into a group and one semiconductor device is allocated to each group of drain signal lines DL.

Further, the counter voltage signal lines CL have right-side end portions thereof in the drawing, for example, connected in common, the connection line extends over the sealing material SL and the extended end constitutes a terminal CLT. A voltage which constitutes the reference with respect to the video signal is supplied from this terminal CLT.

The respective gate signal lines GL are sequentially selected one after another in response to the scanning signals from the scanning signal driving circuit V.

Further, to the respective drain signal lines DL, the video signals are supplied from the video signal driving circuit He in conformity with timing for selecting the gate signal lines GL.

In the above-mentioned embodiment, the scanning signal driving circuit V and the video signal driving circuit He are formed of the semiconductor devices which are mounted on a transparent substrate SUB1. However, these circuits may be constituted of a so-called tape carrier type semiconductor device which establishes the connection between the transparent substrate SUB1 and the printed circuit board (not shown in the drawing) by spanning. Further, when a semiconductor layer of the thin film transistor TFT is made of polycrystalline silicon (p-Si), a semiconductor element made of the polycrystalline silicon may be formed on the surface of the transparent substrate SUB1 together with wiring layers, for example.

<<Constitution of Pixel>>

Figure 1A:
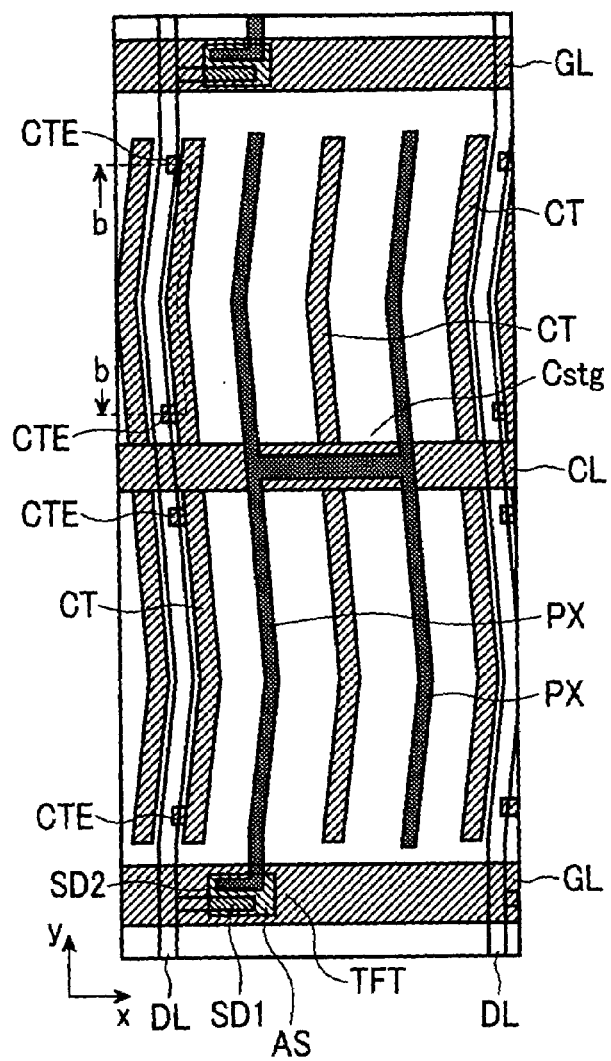
FIG. 1 is a constitutional view showing one embodiment of a pixel of a liquid crystal display device according to the present invention.
Figure 1B:
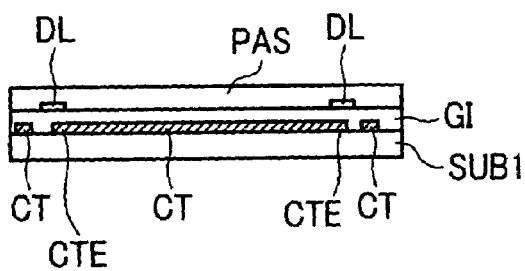

FIG. 1(A) is a plan view showing one embodiment of the constitution of the pixel in the above-mentioned pixel region. Further, FIG. 1(B) is a cross-sectional view taken along a line b—b in FIG. 1(A).

On a liquid-crystal-side surface of the transparent substrate SUB1, first of all, the gate signal lines GL which extend in the x direction and are arranged in parallel in the y direction and drain signal lines which extend is the y direction and are arranged in parallel in the x direction are formed.

These gate signal lines GL surround rectangular regions together with the drain signal lines DL which will be explained later and these regions constitute the pixel regions.

Further, in the region defined between the respective gate signal lines GL, the counter voltage signal lines CL which are arranged in parallel to the gate signal lines GL are formed.

These counter voltage signal lines CL are integrally formed with the counter electrodes CT, wherein the counter electrodes CT are constituted of a group consisting of a plurality of (three in the drawing) of electrodes which extend in the y direction and are arranged in parallel in the x direction within the pixel region. The separation distance between respective electrodes is set substantially equal.

Here, among the above-mentioned group of electrodes, a pair of counter electrodes CT which are positioned at both sides, for example, that is, the counter electrode CT which are arranged close to the drain signal lines DL described later have a width thereof made slightly larger than a width of other counter electrode CT.

This is because that an electric field from the drain signal line DL can be easily terminated to the counter electrode CT which is disposed close to the drain signal line DL and it is possible to prevent the electric field from terminating to the pixel electrode PX described later by passing over the counter electrode CT. That is, when the electric field is terminated to the pixel electrode PX, this gives rise to noises.

Further, out of respective counter electrodes CT which are arranged close to the drain signal lines DL, one counter electrode CT (counter electrode which is positioned at the left side in the drawing, for example) is provided with a plurality of extension portions CTE, wherein portions of the extension portions CTE extend to regions where the drain signal line DL is formed.

That is, in respective regions which are formed by dividing the pixel region in halves by the counter voltage signal line CL, the above-mentioned extension portions CTE are formed at a portion of the counter electrode CT which is arranged close to the counter voltage signal line CL and at a distal end portion of the counter electrode CT which is arranged remote from the counter voltage signal line CL.

The constitution that the extension portions CTE reach the region where the drain signal line DL is formed implies that when the drain signal line DL is formed later, portions of the drain signal line DL are overlapped to the extension portions CTL. An advantageous effect brought about by these extension portions CTL will be explained later.

On the surface of the transparent substrate SUB1 on which the gate signal lines GL and the counter voltage signal lines CL are formed in this manner, an insulation film GI which is formed of a silicon nitride film (for example, SiN), for example, is formed such that the insulation film GI also covers the gate signal lines GL, the counter voltage signal lines CL and the counter electrodes CT.

This insulation film GI performs a function of an interlayer insulation film with respect to the gate signal lines GL and the counter voltage signal lines CL in the region where the drain signal lines DL described later are formed. The insulation film GI performs a function of a gate insulation film in a region where the thin film transistor TFT described later is formed. Further, the insulation film GI performs a function of a dielectric film in a region where a capacitance element Cstg described later is formed.

Then, on a surface of the insulation film GI, a semiconductor layer AS which is made of amorphous Si, for example, is formed such that the semiconductor layer AS is overlapped to portions of the gate signal lines GL.

This semiconductor layer AS is a semiconductor layer of the thin film transistor TFT, wherein by forming a drain electrode SD1 and a source electrode SD2 on an upper surface of the semiconductor layer AS, it is possible to constitute an MIS (Metal Insulator Semiconductor) type transistor having an inverse staggered structure which uses a portion of the gate signal line GL as a gate electrode.

Here, the drain electrode SD1 and the source electrode SD2 are formed simultaneously at the time of forming the drain signal lines DL.

That is, the drain signal lines DL which extend in the y direction and are arranged in parallel in the x direction are formed. Portions of the drain signal lines DL are extended to upper surfaces of the semiconductor layers AS to form drain electrodes SD1. Still further, the source electrodes SD2 are formed in a spaced apart manner from the drain electrode SD1 by an amount corresponding to a channel length of the thin film transistor TFT.

Further, at the time of forming the drain signal lines DL, the pixel electrodes PX are simultaneously and integrally formed with the source electrodes SD2. The pixel electrode PX is constituted of, in the same manner as the above-mentioned counter electrode CT, a group of a plurality of (two in the drawing) of electrodes which extend in the y direction and are arranged in parallel in the x direction. These respective electrodes are arranged to be positioned between the counter electrodes CT when viewed as a plan view. That is, these respective electrodes are arranged in the order of the counter electrode CT, the pixel electrode PX, the counter electrode CT, the pixel electrode PX, . . . , the counter electrode CT at an equal interval respectively from one-side drain signal line DL to another-side drain signal line DL.

Further, the pixel electrodes PX which are constituted of a group of electrodes in this manner have portions thereof overlapped to the counter voltage signal lines CL electrically connected to each other.

The portions of the counter voltage signal lines CL to which the respective pixel electrodes PX are electrically connected have a relatively large area and capacitance elements Cstg which use the insulation film GI as a dielectric film are formed in these portions.

These capacitance elements Cstg are designed to have a function of storing the video signals supplied to the pixel electrodes PX, for example, for a relatively long period.

Here, on an interface between the semiconductor layer AS and the drain electrode SD1 and the source electrode SD2, a thin layer which is doped with impurities of high concentration is formed and this layer functions as a contact layer.

With respect to this contact layer, an impurity layer of high concentration is already formed on a surface thereof at the time of forming the semiconductor layer AS, for example, and can be formed by using patterns of the drain electrode SD1 and the source electrode SD2 formed on an upper surface of the contact layer as masks and by etching the impurity layer exposed from the patterns.

In this manner, on the surface of the transparent substrate SUB1 on which the thin film transistors TFT, the drain signal lines DL, the drain electrodes SD1, the source electrodes SD2 and the pixel electrodes PX are formed, a protective film PAS which is formed of a silicon nitride film (for example, SiN), for example, is formed. This protective film PAS is served for obviating the direct contact of the liquid crystal of the thin film transistor TFT and for preventing the deterioration of characteristics of thin film transistors TFT. It is needless to say that as other material of this protective film, an organic material such as resin, for example, can be used besides the inorganic material.

Then, on an upper surface of the transparent substrate SUB1 on which the protective film PAS is formed, an orientation film (not shown in the drawing) is formed such that the orientation film covers the protective film PAS. The orientation film is a film which is brought into direct contact with the liquid crystal and determines the initial orientation direction of molecules of the liquid crystal by rubbing formed on a surface of the orientation film.

Figure 3A:
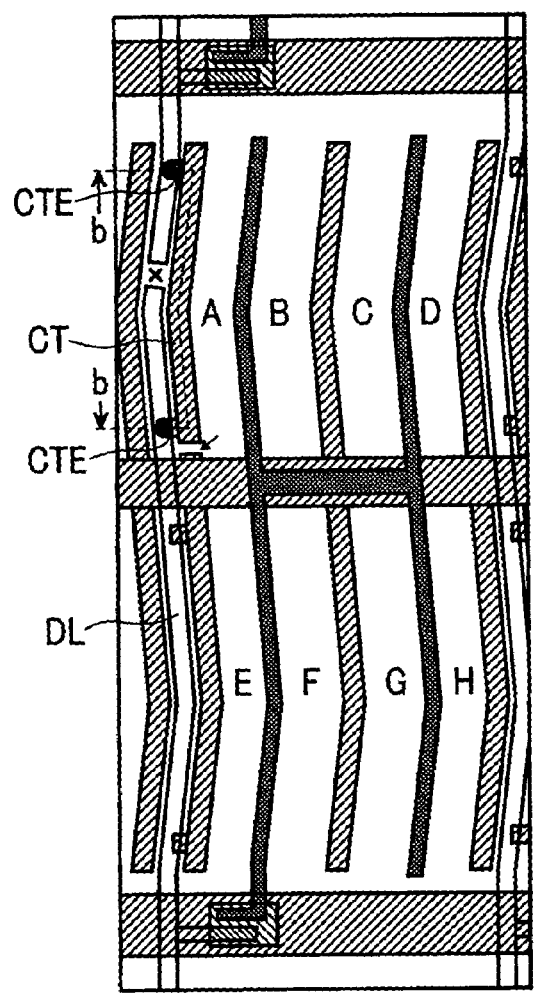
FIG. 3 is a view for explaining one embodiment of repairing of a pixel of the liquid crystal display device shown in FIG. 1.
Figure 3B:
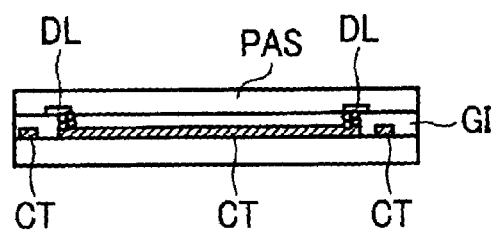

In the liquid crystal display device having such a constitution, as shown in FIG. 3 which corresponds to FIG. 1, when a disconnection occurs at the substantially center of the drain signal line DL which is positioned at the upper region side of the pixel region which is halved by the counter voltage signal line CL, the drain signal line DL is repaired as follows.

First of all, the counter electrode CT which is arranged close to the drain signal line DL on which the disconnection occurs is cut at a portion thereof close to the counter voltage signal line CL so as to terminate the electric connection between the counter electrode CT and the counter voltage signal line CL. To be more specific, the portion of the counter electrode CT which is disposed between the extension portion CTE which is formed on the counter electrode CT and is close to the counter voltage signal line CL and the counter voltage signal line CL is divided.

Cutting or dividing of the counter electrode CT can be easily performed using scanning of laser beams, for example.

Next, laser beams are radiated to a portion of the drain signal line DL which is overlapped to the extension portion CTE formed on the counter electrode CT close to the counter voltage signal line CL so as to establish the electric connection between the drain signal line DL and the extension portion CTE. That is, due to the radiation of the laser beams, a hole is formed in the drain signal line DL and the insulation film GI arranged below the drain signal line DL and, at the same time, due to melting of a material of the drain signal line DL, the material is adhered to the extension portion CTE so that the electric connection between the drain signal line DL and the extension portion CTE is established.

Further, laser beams are radiated also to a portion of the drain signal line DL which is overlapped to another extension portion CTE formed on the distal end portion (portion remote from the counter voltage signal line CL) of the counter electrode CT so as to establish the electric connection between the drain signal line DL and the extension portion CTE.

Here, it is not always necessary to perform the above-mentioned three operations in the above-mentioned order and the order may be arbitrarily determined.

After performing such an operation, the counter electrode CT which is arranged close to the drain signal line DL which is disconnected loses the function thereof and functions as a bypass of the drain signal line DL. Accordingly, the drain signal line DL is repaired.

In this case, a region A which is disposed between the existing counter electrode CT which function as the bypass and the pixel electrode PX which is arranged close to the counter electrode CT loses a pixel display function. However, this region is considered as an extremely small region compared to the whole regions ranging from the region B to the region H where the normal display is performed and hence, it is possible to suppress the region to a state which hardly affects the display.

Embodiment 2.

Figure 4A:
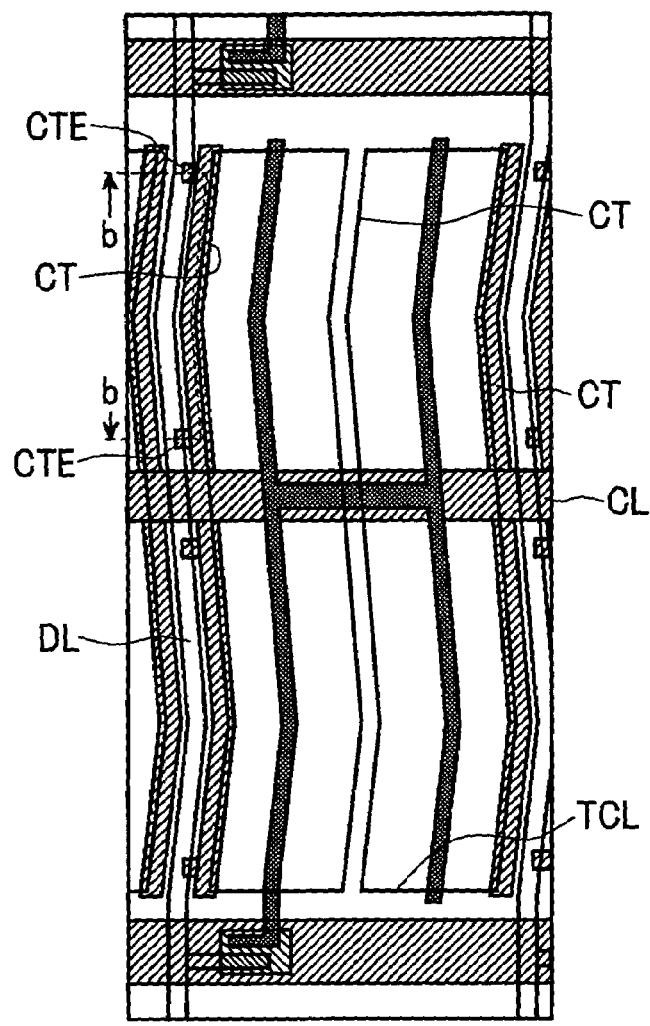
FIG. 4 is a constitutional view showing another embodiment of the pixel of the liquid crystal display device according to the present invention.
Figure 4B:
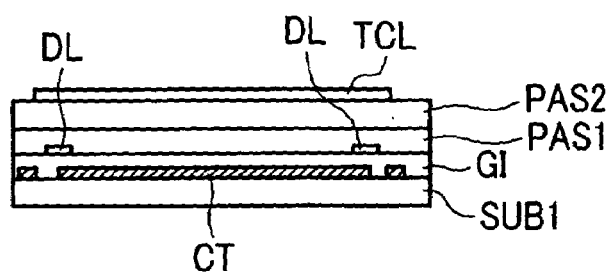

FIG. 4(A) is a plan view showing another embodiment of the pixel of the liquid crystal display device according to the present invention. Further, FIG. 4(B) is a cross-sectional view taken along a line b—b in FIG. 4(A).

FIG. 4(A) corresponds to FIG. 1(A). The constitution which makes this embodiment different from the embodiment shown in FIG. 1(A) lies in that, first of all, the counter electrode CT which runs in the y direction at the center of the pixel region (the counter electrode CT excluding at least the counter electrodes CT which are arranged close to the drain signal lines DL) is formed on an upper surface of the protective film PAS.

Further, the counter electrode CT which is formed on the upper surface of the protective film PAS is integrally formed with a grid-like conductive layer which is formed on the protective film PAS such that the conductive layer covers the gate signal lines GL and the drain signal lines DL.

To enhance the numerical aperture of the pixel, for example, the conductive layer is made of a light transmitting material such as ITO (Indium Tin Oxide), ITZO (Indium Tin Zinc Oxide), IZO (Indium Zinc Oxide), $SnO_2$ (zinc oxide), $In_2O_3$ (indium oxide) or the like. Accordingly, in this specification, the conductive layer is referred to as "light transmitting conductive layer TCL" hereinafter.

The light transmitting conductive layer TCL which is formed such that the light transmitting conductive layer TCL covers the gate signal lines GL and the drain signal lines DL is configured to make the electric field generated in response to respective signals supplied to the gate signal lines GL and the drain signal lines DL terminate thereto. This is because that when the electric field is terminated to the pixel electrode PX, this gives rise to noises thus degrading the quality of display. Accordingly, the light transmitting conductive layer TCL formed in a grid pattern has a center axis thereof substantially aligned with the center axes of the gate signal line GL and the drain signal line DL and, at the same time, the light transmitting conductive layer TCL has a large width.

Further, such a light transmitting conductive layer TCL is configured to have a function of a counter voltage signal line which supplies counter voltage signals to the counter electrodes CT which is integrally formed with the light transmitting conductive layer TCL. Accordingly, it is also possible to have an advantageous effect that the total electric resistance value of the light transmitting conductive layer TCL together with the counter voltage signal line CL can be reduced.

Further, due to such a constitution, the protective film PAS is constituted of a sequential laminated body particularly consisting of a protective film PAS1 formed of an inorganic material layer such as silicon nitride film (for example, SiN), for example, and a protective film PAS2 formed of an organic material layer made of resin, for example. This constitution is provided for reducing the dielectric constant of the protective film PAS as a whole so as to reduce the parasitic capacitance between the light transmitting conductive layer TCL and the gate signal line GL or the drain signal line DL.

Figure 5A:
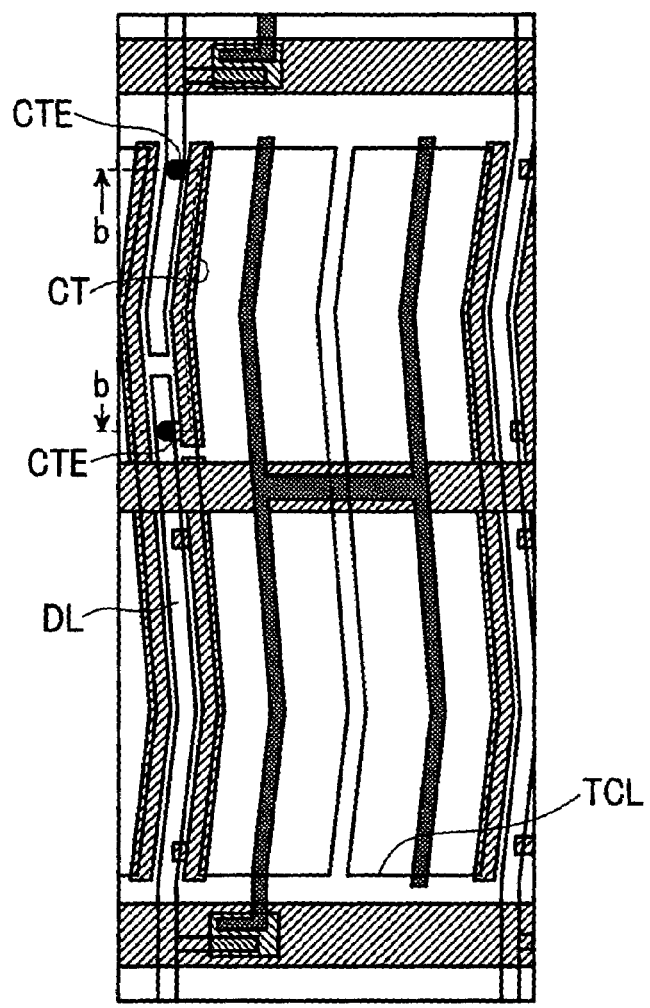
FIG. 5 is a view for explaining one embodiment of repairing of a pixel of the liquid crystal display device shown in FIG. 4.
Figure 5B:
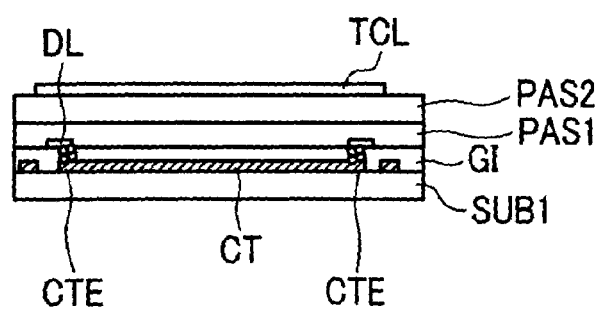

Also in the above-mentioned constitution, the counter electrode CT which is formed close to the drain signal line DL is, in the same manner as the constitution described in the embodiment 1, that is, as shown in FIG. 5 corresponding to FIG. 4, provided with extension portions CTE which are overlapped to the drain signal line DL at a portion of the counter electrode CT close to the counter voltage signal line CL and at the distal end portion of the counter electrode CT.

Also in this case, it is possible to repair the drain signal line DL in the same order shown in FIG. 3.

Here, in the above-mentioned embodiment, the signal line which runs in the x direction at the center of the pixel region is formed as the counter voltage signal line CL. However, it is needless to say that this signal line may be formed as the capacitance signal line.

A connection portion of the pixel electrode PX which is constituted of a group of electrodes consisting of two electrodes, for example, is positioned above the capacitance signal line CPL and a capacitance element Cstg which uses an insulation film GI as a dielectric is formed between the capacitance signal line CPL and the connection portion.

In this case, an electrode (corresponding to the counter electrode CT in FIG. 4) which is arranged close to the drain signal line DL and is connected to the capacitance signal line (corresponding to counter voltage signal line CL in FIG. 4) is configured to function as a shield electrode which terminates the electric field from the drain signal line DL and also is configured to function as a bypass line at the time of repairing.

Embodiment 3.

Figure 6A:
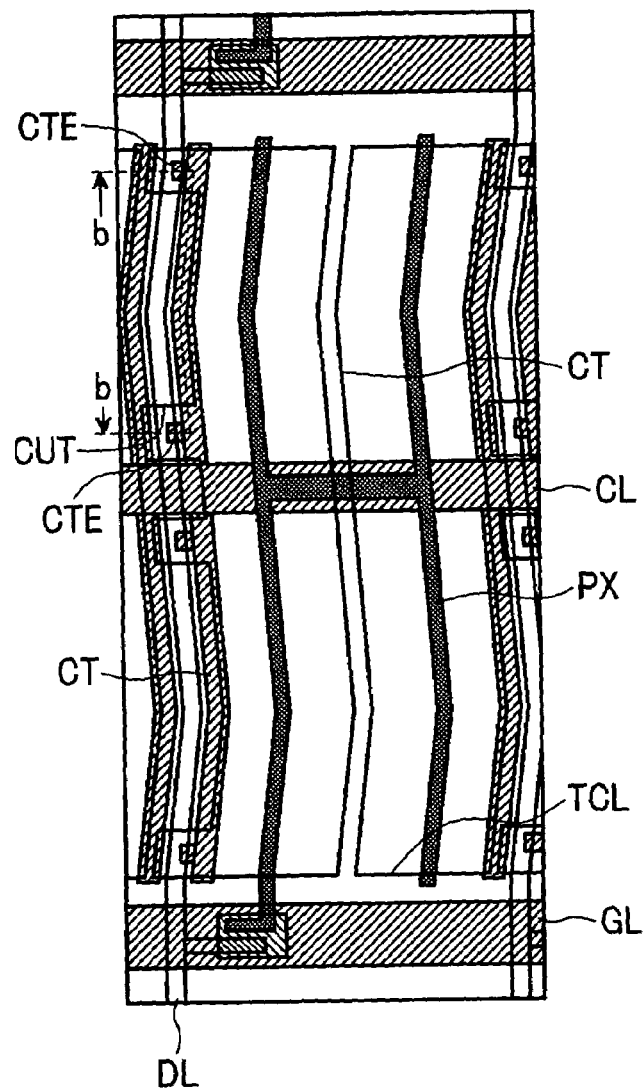
FIG. 6 is a constitutional view showing another embodiment of the pixel of the liquid crystal display device according to the present invention.
Figure 6B:
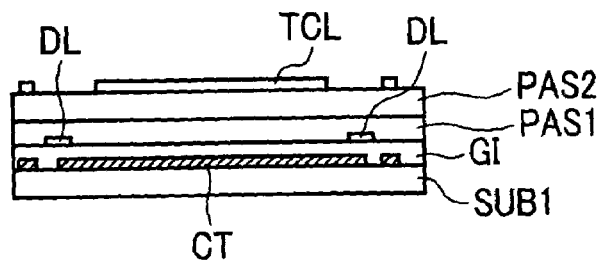

FIG. 6(A) is a plan view showing another embodiment of the pixel of the liquid crystal display device according to the present invention. Further, FIG. 6(B) is a cross-sectional view taken along a line b—b in FIG. 6(A).

FIG. 6(A) corresponds to FIG. 4(A). The constitution which makes this embodiment different from the constitution shown in FIG. 4(A) lies in that notched portions CUT are formed in portions of the light transmitting conductive layer TCL which is integrally formed with the counter electrode CT formed on the upper surface of the protective film PAS.

That is, the notched portions CUT are formed in the light transmitting conductive layer TCL at portions thereof arranged above the drain signal line DL and overlapped to the extension portions CTE of the counter electrode CT close to the drain signal line DL such that the extension portions CTE are exposed from the light transmitting conductive layer TCL.

Figure 7A:
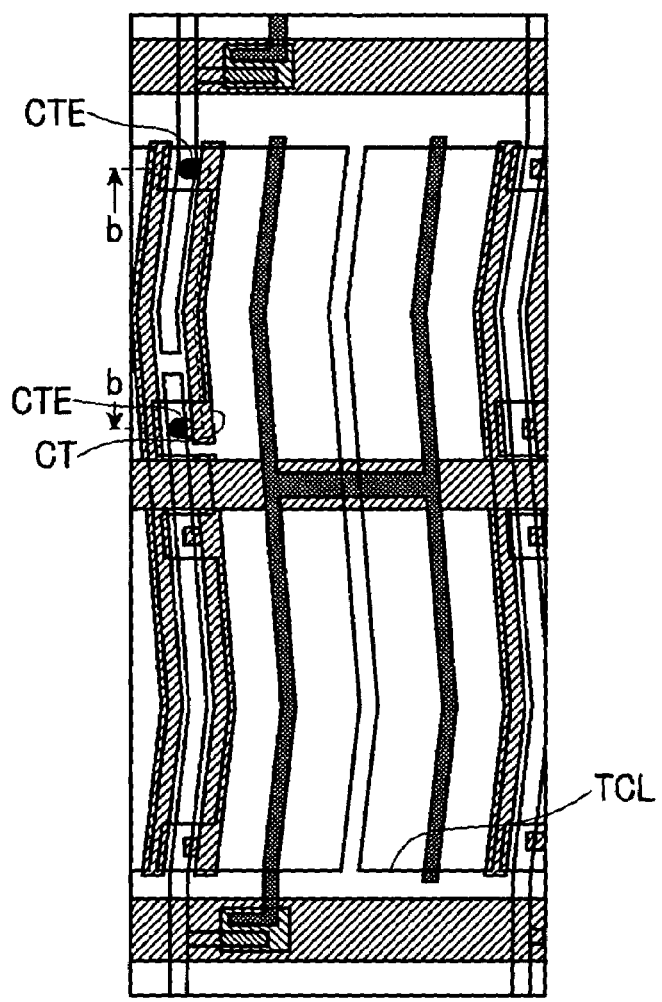
FIG. 7 is a view for explaining one embodiment of repairing of a pixel of the liquid crystal display device shown in FIG. 6.
Figure 7B:
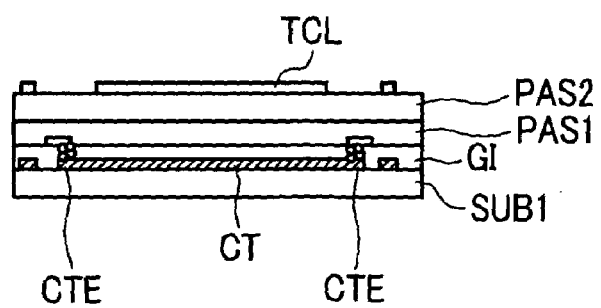

Due to such a constitution, as shown in FIG. 7 which corresponds to FIG. 6, at the time of repairing the disconnection of the drain signal line DL, the light transmitting conductive layer TCL is not formed at the portions to which laser beams are radiated.

Accordingly, it is possible to obtain an advantageous effect that the repairing of the disconnection can be surely performed even after the light transmitting conductive layer TCL is formed. That is, it is possible to structurally eliminate the possibility that the extension portions CTE of the extension portion CTE or the drain signal line DL and the light transmitting conductive layer TCL are short-circuited at the time of repairing the disconnection using laser beams. This advantageous effect is obtained when the extension portions CTE of the counter electrode CT are notched at crossing portions of the extension portion CTE and the drain signal line DL. Accordingly, in the constitution where the line or electrode has an overlapped position below the drain signal line DL by way of an insulation film and a conductive layer is formed above the drain signal line DL by way of an insulation film corresponding to the overlapped portion, it is possible to achieve repairing of disconnection by providing a notch or a rectangular removal pattern to the conductive layer. Further, as the notch or the rectangular removal pattern, when the conductive layer remains, it is possible to hold the electric connection around the overlapped position and hence, it is possible to hold a shielding effect of a leaked electric field from the drain signal line DL due to the light transmitting conductive layer TCL in the major region of the drain signal line DL other than the overlapped position.

In view of the above-mentioned concept of this embodiment, it is needless to say that the notched portions CUT are formed as hole portions. This is because that it is sufficient to have a pattern in which the light transmitting conductive layer TCL is not formed at portions to which laser beams are radiated.

Here, it is needless to say that, also in this embodiment, the counter voltage signal line CL is formed as the capacitance signal line.

Embodiment 4.

Figure 8A:
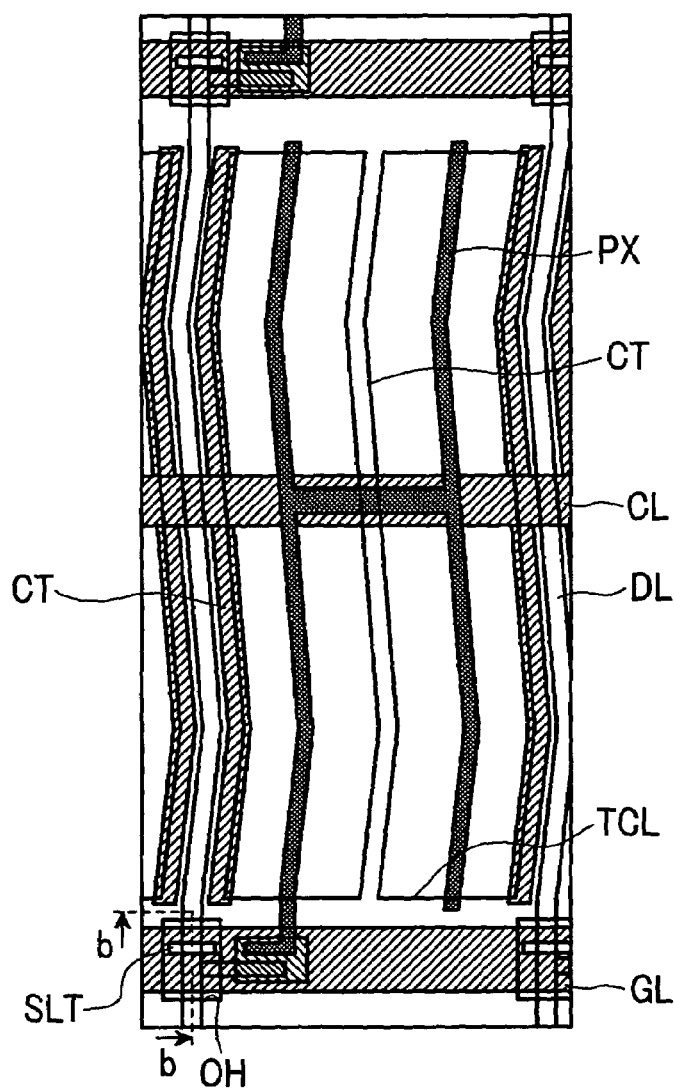
FIG. 8 is a constitutional view showing another embodiment of the pixel of the liquid crystal display device according to the present invention.
Figure 8B:
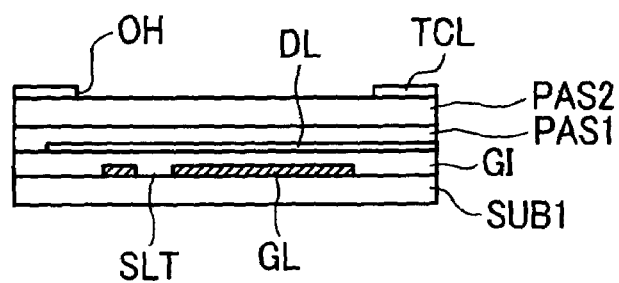

FIG. 8(A) is a plan view showing another embodiment of the pixel of the liquid crystal display device according to the present invention. Further, FIG. 8(B) is a cross-sectional view taken along a line b—b in FIG. 8(A). FIG. 8(A) corresponds to FIG. 4(A).

Different from the embodiment shown in FIG. 4(A), repairing of disconnection of the drain signal line DL is not taken into consideration in this embodiment. That is, this embodiment provides the constitution which facilitates repairing of short-circuiting which is generated between the drain signal line DL and the gate signal line GL via a through hole or the like formed in the insulation film GI formed as a layer below the drain signal line DL at the time of forming the drain signal line DL.

That is, a slit SLT which is arranged parallel to the running direction of the gate signal line GL is formed in a portion of the gate signal line GL which crosses the drain signal line DL. The slit SLT is formed with a length which allows the slit to sufficiently stride over the drain signal line DL.

Then, in the light transmitting conductive layer TCL which is integrally formed with the counter electrode CT on an upper surface of the protective film PAS2, at a portion where the gate signal line GL crosses the drain signal line DL, a hole portion OH which has a larger extension than the portion is formed.

In other words, this embodiment is configured such that the hole portion of the light transmitting conductive layer TCL is formed such that the hole portion sufficiently exposes the portion where the gate signal line GL crosses the drain signal line DL and repairing of short-circuiting using laser beams is facilitated by this portion.

Figure 9:
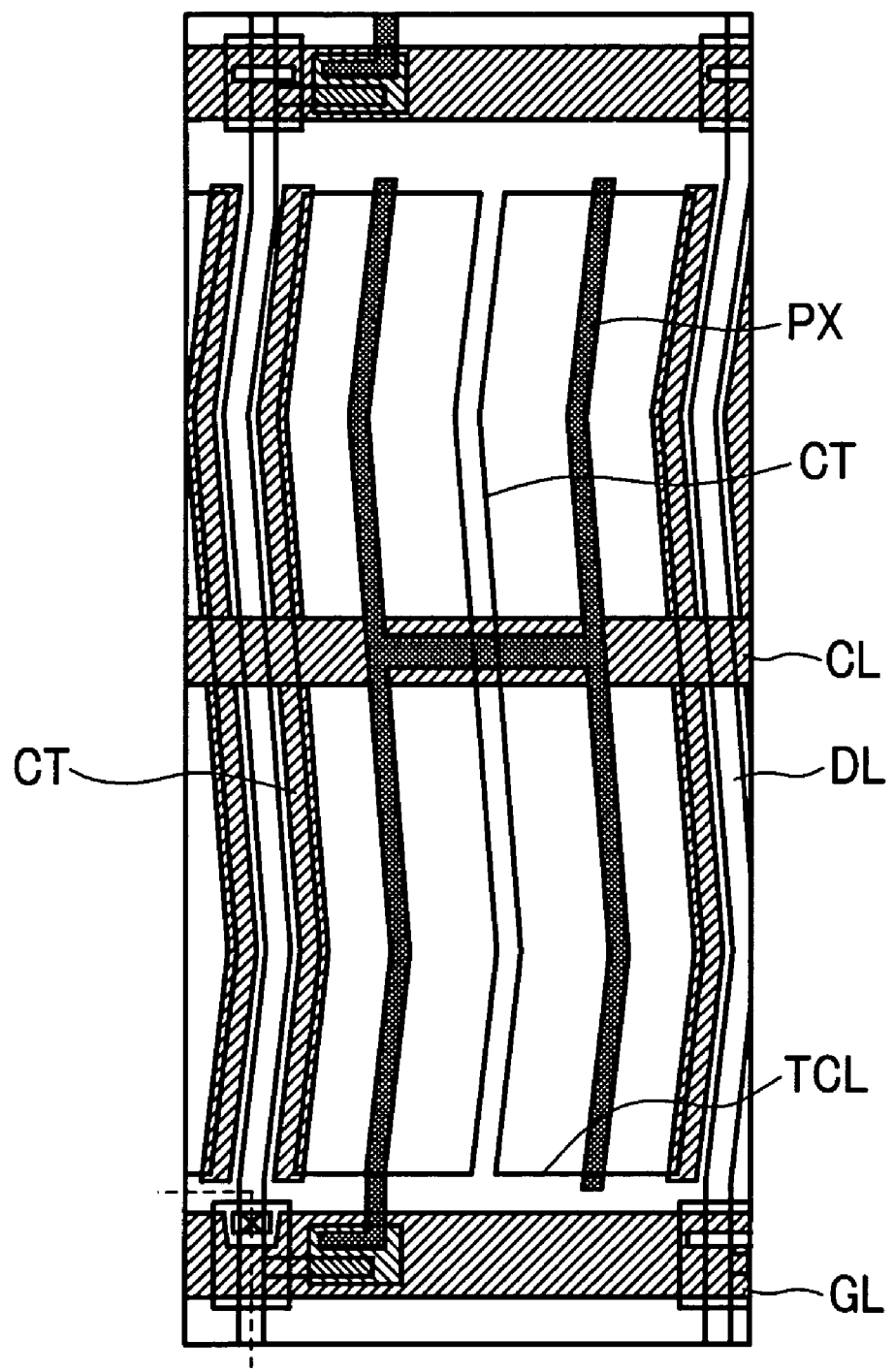
FIG. 9 is a view for explaining one embodiment of repairing of a pixel of the liquid crystal display device shown in FIG. 8.

That is, as shown in FIG. 9 corresponding to FIG. 8(A) (drawing corresponding to FIG. 8(B) being omitted), when short-circuiting (indicated by "x" in the drawing) is generated between the drain signal line DL and the gate signal line GL via the insulation film GI formed below the drain signal line DL at the time of forming the drain signal line DL, the laser beams are scanned from both ends of the slit SLT to one side portions of respective gate signal lines GL so that a portion of the gate signal line GL which is short-circuited with the drain signal line DL is electrically isolated.

In this case, since the light transmitting conductive layer TCL is not formed at the portion which the laser beams scan, it is possible to easily repair the short-circuiting even after the formation of the light transmitting conductive layer TCL.

Embodiment 5.

Figure 10A:
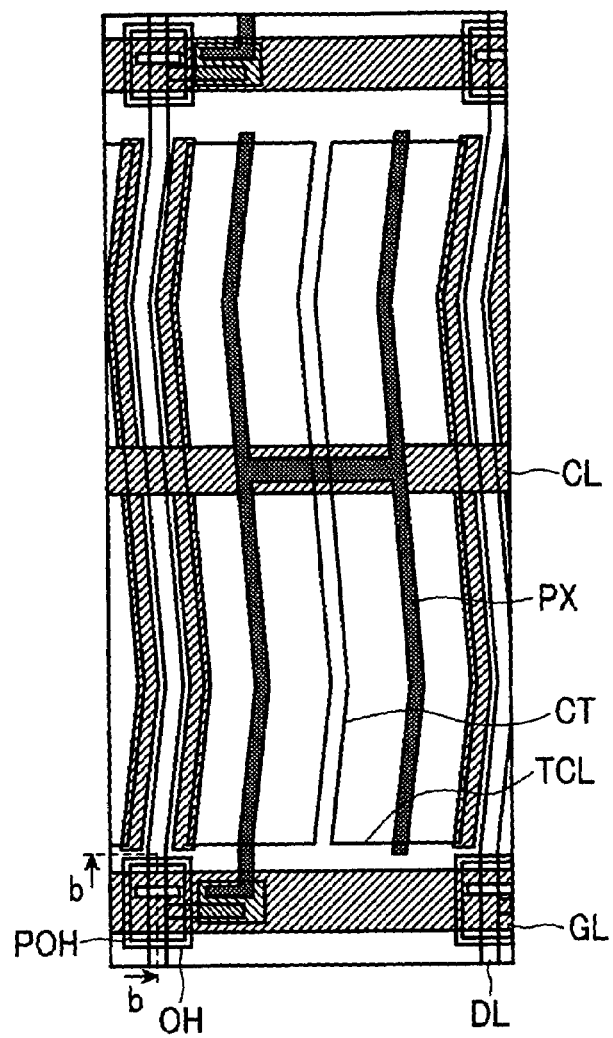
FIG. 10 is a constitutional view showing another embodiment of the pixel of the liquid crystal display device according to the present invention.
Figure 10B:
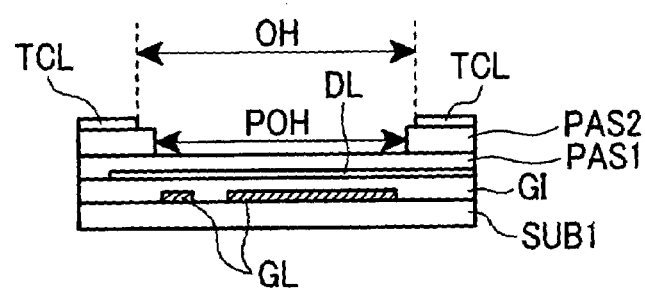

FIG. 10(A) is a plan view showing another embodiment of the pixel of the liquid crystal display device according to the present invention. Further, FIG. 10(B) is a cross-sectional view taken along a line b—b in FIG. 10(A).

FIG. 10 corresponds to FIG. 8.

The constitution which makes this embodiment different from the embodiment shown in FIG. 8 lies in that with respect to portions which are repaired by scanning of laser beams, the hole portions POH are formed not only in the light transmitting conductive layer TCL but also in the protective film PAS2 arranged below the light transmitting conductive layer TCL.

In this case, at the time of forming the light transmitting conductive layer TCL, to prevent a material of the light transmitting conductive layer TCL from being formed on side wall surfaces of the protective film PAS2, the hole portions OH of the light transmitting conductive layer TCL are formed larger than the hole portions POH formed in the protective film PAS2.

This provision is made to sufficiently achieve the parasitic capacitance reduction effect between the light transmitting conductive layer TCL and the drain signal line DL due to the protective film PAS2 formed of organic material.

Further, when the light transmitting conductive layer TCL is arranged at the side face, the probability of occurrence of short-circuiting at the time of repairing using laser beams is increased. This provision is made to structurally eliminate such possibility.

Compared to the protective film PAS1 which is formed of the inorganic film, since the protective film PAS2 is formed of an organic film, the protective film PAS2 is liable to be easily dissolved, evaporated or diffused due to heat generated by laser beams. When the evaporation or the diffusion of the protective film PAS2 occurs at the time of performing repairing using laser beams, although the lines may be repaired, they contaminate the liquid crystal thus generating new minute defective regions and hence, the complete repairing cannot be obtained. Accordingly, to obtain the structure which can repair the lines more reliably, regions for removing the protective film PAS2 are formed as the hole portions POH in the opening portions of the hole portions OH. Due to such a constitution, at the time of repairing the lines using laser beams, it is possible to obviate the occurrence of secondary defects attributed to the above-mentioned protective film PAS2.

Embodiment 6.

Figure 11A:
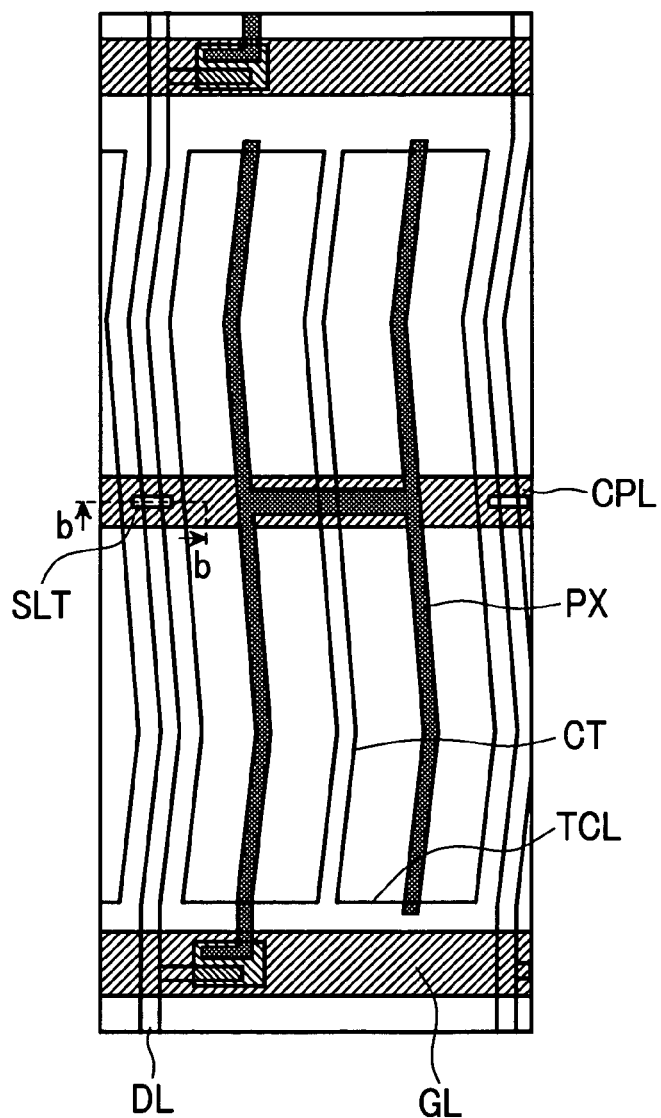
FIG. 11 is a constitutional view showing another embodiment of the pixel of the liquid crystal display device according to the present invention.
Figure 11B:
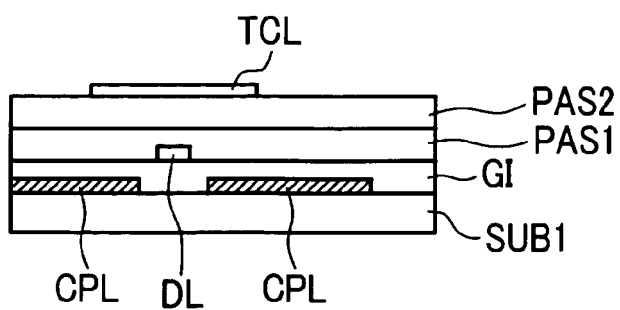

FIG. 11(A) is a plan view showing another embodiment of the pixel of the liquid crystal display device according to the present invention. Further, FIG. 11(B) is a cross-sectional view taken along a line b—b in FIG. 11(A).

FIG. 11(A) is a view which corresponds to FIG. 4(A).

The constitution which makes this embodiment different from the embodiment shown in FIG. 4(A) lies in, first of all, that the counter voltage signal lines CL and the counter electrodes CT which are integrally formed with the counter voltage signal lines CL are not formed. That is, the counter electrodes CT are formed on an upper surface of the protective film PAS2 and are integrally formed with a light transmitting conductive layer TCL which is formed such that the light transmitting conductive layer TCL covers the gate signal lines GL and the drain signal lines DL.

In this case, the light transmitting conductive layer TCL which covers the drain signal lines DL has a shielding function with respect to the drain signal lines DL and, at the same time, functions as the counter electrode CT. That is, portions of the light transmitting conductive layer TCL which are projected into the inside of the pixel region from the drain signal line DL perform a function of the counter electrodes CT which generate an electric field between the counter electrode CT and the pixel electrode PX arranged close to the counter electrode CT.

Then, the signal lines which run in the x direction at the approximately center portion of the pixel region are constituted as capacitance signal lines CPL and these capacitance signal lines CPL are formed simultaneously with the formation of the gate signal lines GL.

Figure 15:
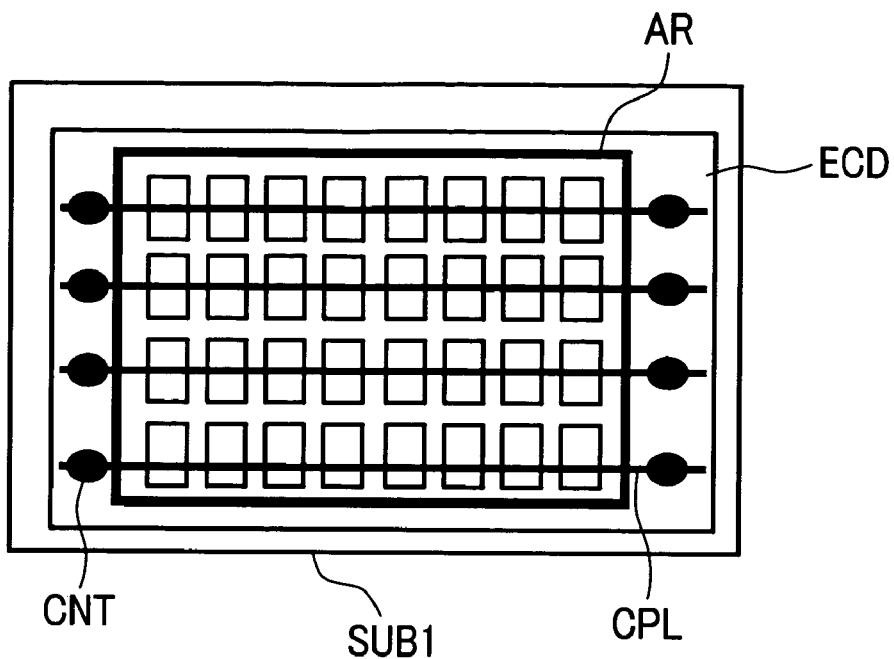
FIG. 15 is an explanatory view showing the connection relationship between a capacitance signal line and a light transmitting conductive layer.

Further, the capacitance signal line CPL is, as shown in FIG. 15, electrically connected to the above-mentioned light transmitting conductive layer TCL over the protective film PAS2 via the contact portions CNT in regions outside the liquid crystal display portion AR. That is, the capacitance signal line CPL is configured not to be connected with the contact portions CNT within the pixel region. Here, the contact portion CNT is formed of a hole which sequentially penetrates or passes through the protective film PAS2, the protective film PAS1 and the insulation film GI.

Above the capacitance signal line CPL, a connection portion between pixel electrodes PX consisting of a group of two electrodes is positioned, and a capacitance element Cstg is formed which uses an insulation film GI as a dielectric between the capacitance signal line CPL and the connection portion.

In such a constitution, at a portion where the capacitance signal line CPL and the drain signal line DL cross each other, a slit SLT is formed such that the slit SLT strides over the drain signal line DL.

Figure 12:
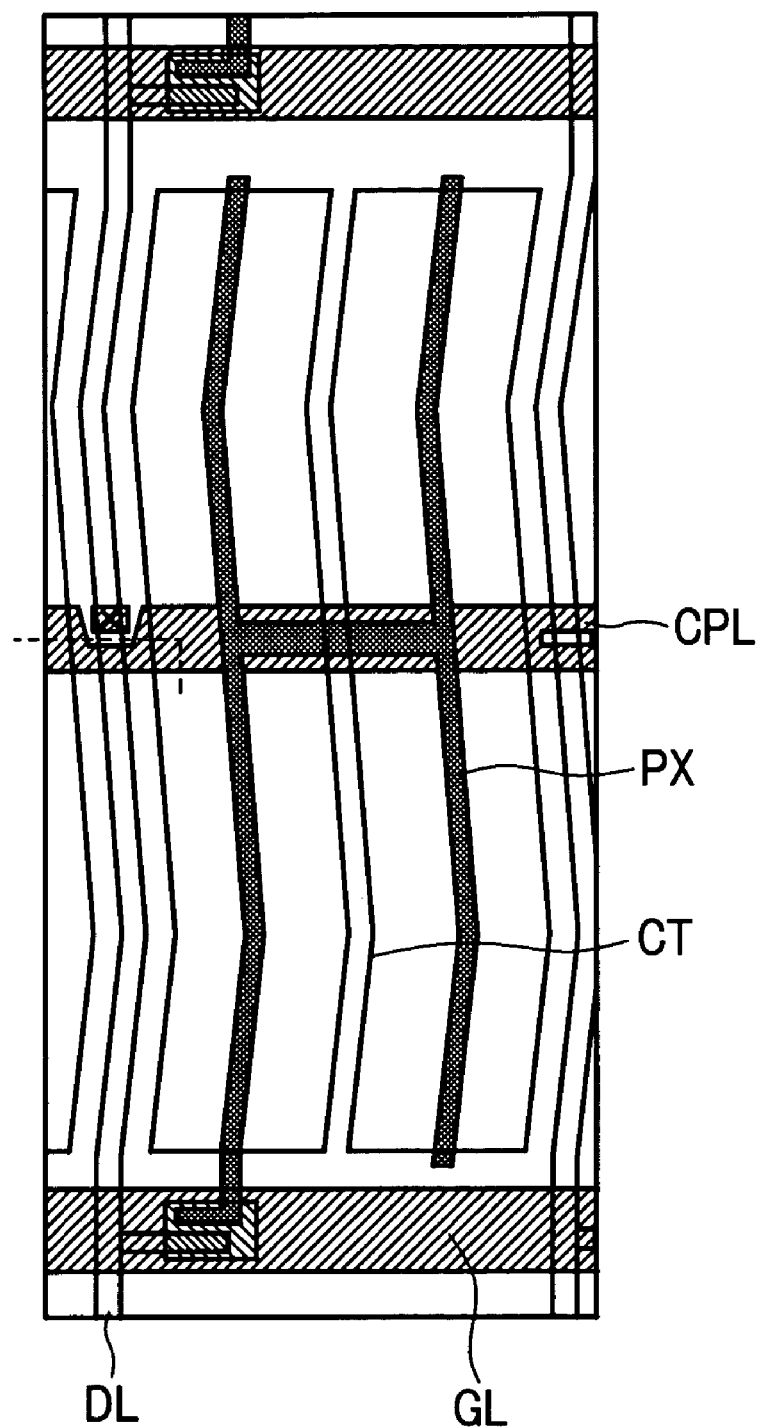
FIG. 12 is a view for explaining one embodiment of repairing of a pixel of the liquid crystal display device shown in FIG. 11.

In this case, as shown in FIG. 12 which corresponds to FIG. 11(A), when short-circuiting is generated between the drain signal line DL and a portion of the capacitance signal line CPL (indicated by a mark x in the drawing) at the time of forming the drain signal line DL, laser beams are scanned from both respective ends of the slit SLT to one side of the capacitance signal line CPL so as to form the notch.

Accordingly, it is possible to electrically isolate the portion of the capacitance signal line CPL which is short-circuited with the drain signal line DL thus achieving the repair.

Embodiment 7.

Figure 13A:
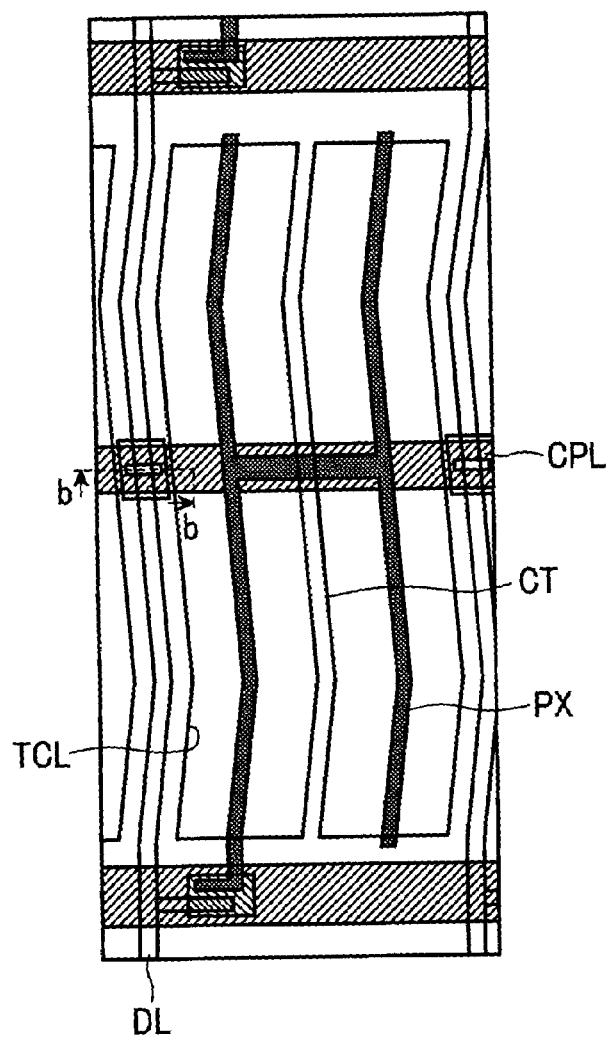
FIG. 13 is a constitutional view showing another embodiment of the pixel of the liquid crystal display device according to the present invention.
Figure 13B:
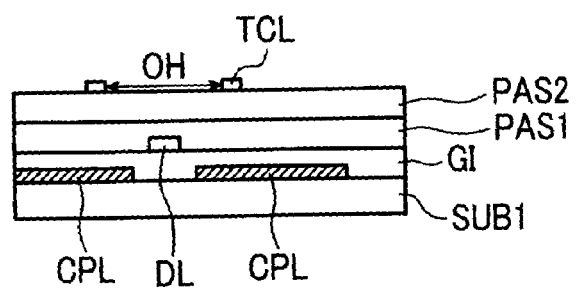

FIG. 13(A) is a plan view showing another embodiment of the pixel of the liquid crystal display device according to the present invention. Further, FIG. 13(B) is a cross-sectional view taken along a line b—b in FIG. 13(A).

FIG. 13(A) is a view which corresponds to FIG. 11(A).

The constitution which makes this embodiment different from the embodiment shown in FIG. 11(A) lies in that at crossing portions of the capacitance signal line CPL and the drain signal lines DL, the hole portions OH which surround the crossing portions and peripheries thereof are formed in the light transmitting conductive layer TCL which is formed on the upper surface of the protective film PAS2. In other words, at the crossing portions of the capacitance signal line CPL and the drain signal lines DL, the light transmitting conductive layer TCL is configured such that the light transmitting conductive layer TCL is not formed on the crossing portions and the peripheries thereof.

Due to such a constitution, after forming the counter electrodes CT and the light transmitting conductive layer TCL which is formed integrally with the counter electrodes CT, it is possible to easily perform repairing as described in the embodiment 6.

Embodiment 8.

Figure 14A:
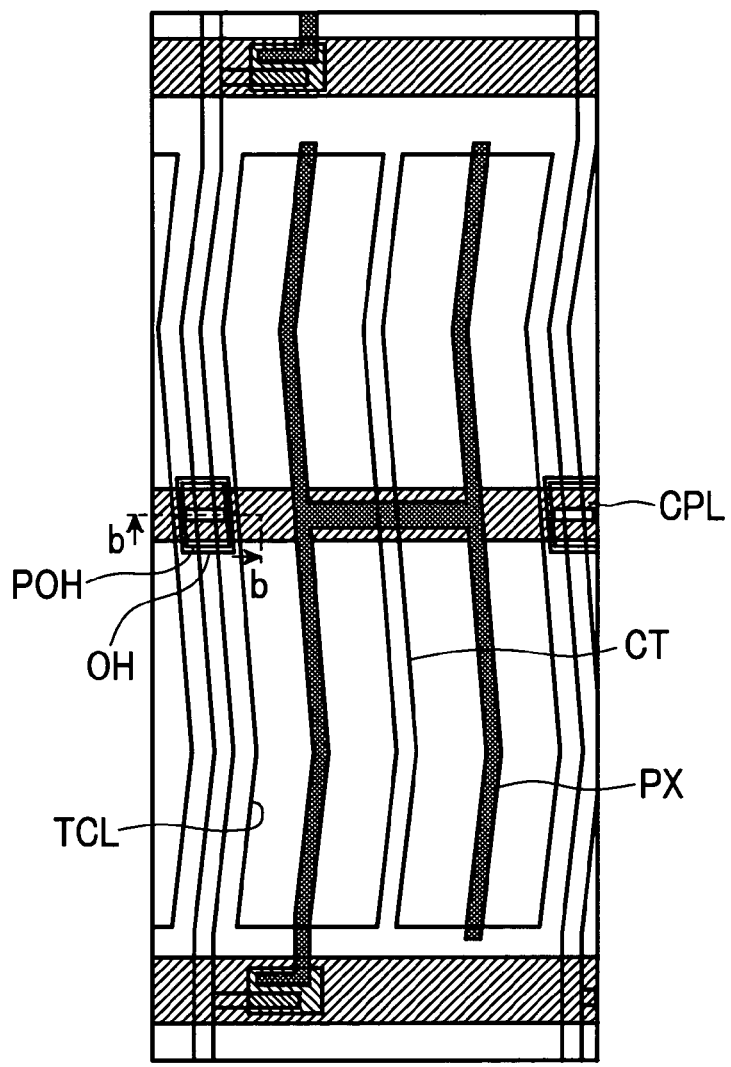
FIG. 14 is a constitutional view showing another embodiment of the pixel of the liquid crystal display device according to the present invention.
Figure 14B:
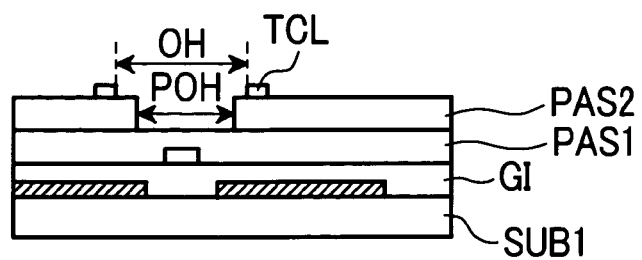

FIG. 14(A) is a plan view showing another embodiment of the pixel of the liquid crystal display device according to the present invention. Further, FIG. 14(B) is a cross-sectional view taken along a line b—b in FIG. 14(A).

FIG. 14(A) is a view which corresponds to FIG. 13(A).

The constitution which makes this embodiment different from the embodiment shown in FIG. 13(A) lies in that at the crossing portions of the capacitance signal line CPL and the drain signal lines DL, the hole portions POH are formed not only in the light transmitting conductive layer TCL but also in the protective film PAS2. In other words, at the crossing portions of the capacitance signal line CPL and the drain signal lines DL, the light transmitting conductive layer TCL is configured such that the protective film PAS2 and the light transmitting conductive layer TCL are not formed on the crossing portions and the peripheries thereof.

Due to such a constitution, the protective film PAS2 which is formed of an organic material layer is not also formed at portions to which the laser beams are scanned for repairing and hence, there arises no drawback attributed to melting of the protective film PAS2 thus it is possible to achieve the reliable repairing.

The above-mentioned embodiments may be used in a single form or in combination. This is because that advantageous effects of respective embodiments can be obtained in a single form or in a coupled manner.

As can be clearly understood from the above-mentioned explanation, according to the liquid crystal display device according to the present invention, it is possible to easily perform repairing and to realize the enhancement of the yield rate.

What is claimed is:

1. A liquid crystal display device comprising:
    a pair of substrates having a liquid crystal layer disposed therebetween;
    a plurality of gate signal lines and at least a first conductive layer formed on one of said pair of substrates;
    at least a first insulating layer formed on a gate signal line;
    a plurality of drain signal lines formed on the first insulating layer and crossing the gate signal lines to form plural pixels;
    at least a second insulating layer formed on a drain signal line;
    wherein the first conductive layer is elongated substantially along the drain signal line and has a plurality of first regions which overlap with the drain signal line, and a second region which is arranged between the plurality of first regions and which does not overlap with the drain signal line ; and
    at least a second conductive layer formed on the second insulating layer and elongated substantially along the drain signal line in overlapping relation to the drain signal line proximate to the second region of the first conductive layer;
    wherein a width of the second conductive layer proximate to the first regions of the first conductive layer is smaller than a width thereof proximate to the second region of the first conductive layer.

2. A liquid crystal display device according to claim 1, wherein the overlapping region of the drain signal line and the first conductive layer is plural in each of the pixels, and the width of the second conductive layer is smaller in each overlapping region.

3. A liquid crystal display device according to claim 1, wherein the second conductive layer is offset from the first conductive layer at the overlapping region of the first conductive layer and the drain signal line, and an overlap to the another first conductive layer is arranged on an opposite side of the drain signal line relative to the first conductive layer having an overlapping relation with the drain signal line.

4. A liquid crystal display device according to claim 1, wherein the second insulating layer includes a lower insulating layer made of an inorganic material and an upper insulating layer formed on the lower insulating layer and made of an organic material,
    wherein the upper insulating layer is offset from the overlapping region of the first conductive layer and the drain signal line.

* * * * *